United States Patent
Breton et al.

(10) Patent No.: US 8,443,190 B2
(45) Date of Patent: May 14, 2013

(54) METHOD FOR SECURING A TWO-WAY COMMUNICATIONS CHANNEL AND DEVICE FOR IMPLEMENTING SAID METHOD

(75) Inventors: Sébastien Breton, Arçonnay (FR);
Dominique Cappy, Le Chesnay (FR);
Jean-Yves Euzenat, Jouy-en-Josas (FR)

(73) Assignee: Thales, Neuilly-sur-Seine (FR)

( * ) Notice: Subject to any disclaimer, the term of this patent is extended or adjusted under 35 U.S.C. 154(b) by 85 days.

(21) Appl. No.: 12/745,555

(22) PCT Filed: Nov. 27, 2008

(86) PCT No.: PCT/EP2008/066316
§ 371 (c)(1),
(2), (4) Date: Mar. 8, 2011

(87) PCT Pub. No.: WO2009/068603
PCT Pub. Date: Jun. 4, 2009

(65) Prior Publication Data
US 2011/0150220 A1    Jun. 23, 2011

(30) Foreign Application Priority Data
Nov. 30, 2007  (FR) ..................... 07 08397

(51) Int. Cl.
*G06F 7/04* (2006.01)
(52) U.S. Cl.
USPC .............................. 713/166; 726/26
(58) Field of Classification Search .............. 726/26; 713/166
See application file for complete search history.

(56) References Cited

U.S. PATENT DOCUMENTS

| | | |
|---|---|---|
| 2004/0260810 A1 | 12/2004 | Bernoth |
| 2006/0020800 A1* | 1/2006 | Holden et al. ............ 713/171 |
| 2006/0123482 A1* | 6/2006 | Aaron ............... 726/25 |
| 2007/0150965 A1* | 6/2007 | Redlich et al. ........... 726/27 |

* cited by examiner

*Primary Examiner* — Christopher Brown
(74) *Attorney, Agent, or Firm* — Baker & Hostetler LLP

(57) ABSTRACT

The present invention relates to a method for securing a two-way communications channel between at least a network N1 and a network N2 with a lower level of security than N1, and a device to implement the method. The method comprises at least the following steps: defining one or more types of data authorized to be transmitted from N1 to N2; routing a datum to an encryption/decryption module or to a filtering module, according to the datum type. The invention notably allows communications to be established between a plurality of networks with different levels of security.

6 Claims, 2 Drawing Sheets

METHOD FOR SECURING A TWO-WAY COMMUNICATIONS CHANNEL AND DEVICE FOR IMPLEMENTING SAID METHOD

CROSS-REFERENCE TO RELATED APPLICATIONS

This application is a National Stage of International Patent Application No. PCT/EP2008/066316, filed on Nov. 27, 2008, which claims priority to foreign Patent Application No. FR 0708397, filed on Nov. 30, 2007, the disclosures of which are incorporated herein by reference in their entirety.

FIELD OF THE INVENTION

The present invention relates to a method for protecting a two-way communications channel and a device to implement the method. The invention notably allows communications to be established between a plurality of networks with different levels of security

BACKGROUND OF THE INVENTION

Security standards relating to communications between networks with different levels of security often impose conflicting constraints with requirements for interoperability between said networks, but also with required performance in terms of data transport.

By way of illustration, an internal corporate network is authorized to receive certain data from an external network, but no datum from the internal network may be transmitted in unencrypted form to the external network. Thus, for example, if two corporate networks communicating via an intermediate public network—for example, the Internet—wish to exchange confidential information, an encryption/decryption device is placed at the output of each of these corporate networks. All of the data are encrypted at the output of the transmitting corporate network, these data being decrypted by the receiving corporate network in such a way that no datum originating from a corporate network is transmitted in unencrypted form to the intermediate public network.

On the one hand, in order to be able to transfer data in the uplink direction, i.e. from the external network to the internal corporate network, in other words from a low-sensitivity network to a network with a higher sensitivity level, the data transport protocols generally require transmissions of data in the downlink direction, i.e. from the internal network to the external network. In fact, in addition to the useful data which are to be transported (set of data often referred to as the "user traffic plan"), there are also signaling and control data, inherent in the management of the data transport by the protocol, said data having to be transmitted at the same time in the uplink and the downlink directions. The signaling and control data, which exist notably for the IP (Internet Protocol) and Ethernet protocols, are for example, acknowledgements of receipt or priority markers in order to manage a quality of service during the data transmission sessions. On the other hand, the processing applied to the data (total encryption) is identical regardless of their type, which, in a context of development of multi-media communications channels combining voice, data or video, becomes more and more difficult.

Also, in order to benefit from certain basic services such as quality of service management, it is necessary to establish a two-way communications channel, encrypted or otherwise, authorizing the signaling and/or control data to be transmitted between the protected networks and the intermediate public network.

Moreover, the absence of means allowing data to be exchanged in a protected manner between networks with different levels of security also results in duplication of equipment and associated management resources. For example, each network must include a domain name server, a universal time server or any other type of service which is a priori non-confidential, but essential to its operation. Moreover, the diagnostics of the status of the public network cannot be carried out through the encryption/decryption devices. For example, it is impossible to send a signal to a public network indicating an incident which has occurred on the protected network, as a simple malfunction alarm, which is intrinsically non-confidential, cannot be transmitted from the protected network to a network with a lower level of protection.

An alternative solution consists in authorizing certain types of selected data to be transmitted in unencrypted form and without control via the public network, in other words, creating an additional communications channel for certain types of data. However, this solution entails risks, as an attacker is able to exploit this channel to cause information to leak from a protected network

SUMMARY OF THE INVENTION

One object of the invention is to propose means for improving the interoperability between networks with different levels of security, while limiting the risks of compromising sensitive data. For this purpose, the subject of the invention is a method for securing a two-way communications channel between at least a network N1 and a network N2 with a lower level of security than N1, characterized in that it comprises at least the following steps:
    defining one or more types of data authorized to be transmitted from N1 to N2;
    for a datum transmitted from N1 to N2:
        if the datum is of a type authorized to be transmitted between N1 and N2, routing the datum to a first filtering step, otherwise routing the datum to an encryption step,
        if the datum is routed to the first filtering step:
            saving the context associated with this datum,
            applying one or more analysis filters to the datum to prevent the creation of a hidden communications channel,
    for a datum transmitted from N2 to N1:
        if the datum is of a type authorized to be transmitted between N1 and N2, routing the datum to a second filtering step, otherwise routing the datum to a decryption step;
        if the datum is routed to the second filtering step:
            comparing the context of the datum with the context saved during the first filtering step and blocking the datum if the contexts are inconsistent,
            otherwise, applying one or more analysis filters to the datum.

According to one embodiment, the filtering step comprises a phase of syntactic analysis of the data, said phase checking the validity of the format of the datum according to the protocol used for the transmission of this datum.

According to one embodiment, the filtering step comprises a phase of semantic analysis of the data, said phase checking the consistency of the responses transmitted from the network N2 to the network N1 in relation to the requests transmitted by the network N1 to the network N2.

According to one embodiment, the filtering step comprises a phase of behavioral analysis of the data, said phase evaluating the probability of harmlessness of the data exchanges between the network N1 and the network N2 with regard to predefined scenarios for interconnection between these two networks, an interconnection scenario defining, on the basis of the states of the data transmission protocol controller, expected durations of transition between these states.

According to one embodiment, the filtering step comprises a phase of re-transcription of a datum formatted by a first protocol to retranslate it into a datum formatted by a second protocol.

The subject of the invention is also a device to establish a two-way communications channel between at least a first network N1 and a second network N2 with a lower level of security than N1, the device including an encryption module and a decryption module, the device including at least a first routing module, a second routing module and a filtering module, the first routing module guiding the data packets originating from the first network N1 either to the encryption module or to the filtering module, the second routing module guiding the data packets originating from the second network N2 either to the decryption module or to the filtering module, the filtering module implementing the method as described above.

BRIEF DESCRIPTION OF THE DRAWINGS

Other characteristics are explained in the following detailed description, provided by way of a non-limiting example and referring to the attached drawings, in which.

DETAILED DESCRIPTION

For the sake of clarity, elements denoted by the same references in different figures are the same.

Figure 1:
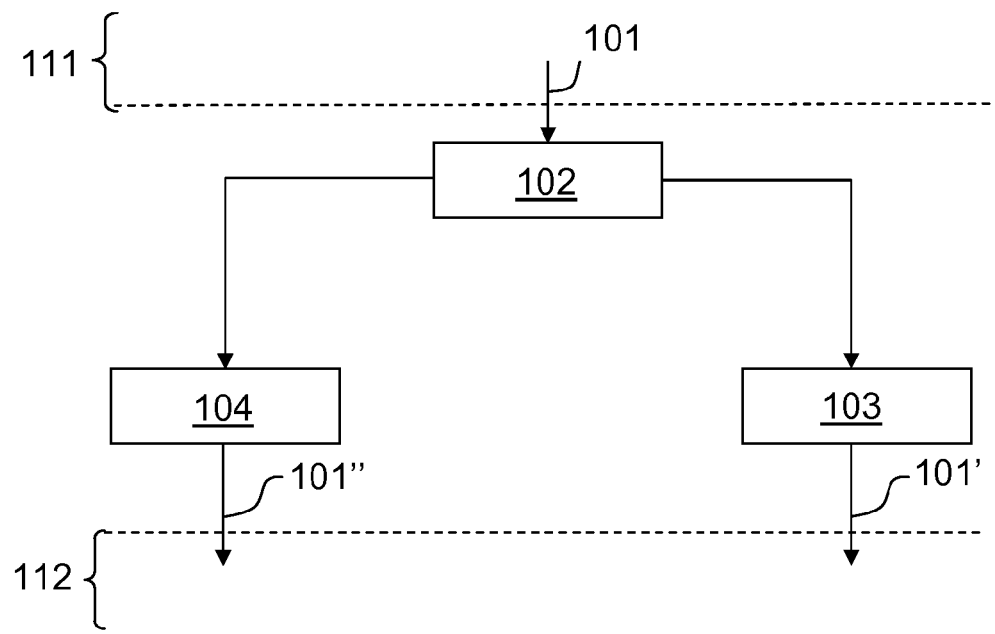
FIG. 1 shows a synopsis illustrating the steps of transmission of a datum from a first network to a second network with a lower level of security than the first network, by applying a protection method according to the invention (downlink direction)

FIG. 1 shows a synopsis illustrating the steps of transmission of a datum from a first network 111 to a second network 112 with a lower level of security than the first network, by applying a protection method according to the invention.

Firstly, a datum 101 originating from the first network 111 is received by a routing module 102, which guides said datum 101 either to an encryption step 103 or to a filtering step 104. The decision to transmit the datum to one or the other of these two steps 103, 104 is taken by the routing module 102 according to the type of this datum 101. The type of the datum 101 is determined, for example, by way of an analysis of the metadata which are associated with it by the transport protocol. For example, the metadata of the IP protocol relating to layer 3 of the OSI ("Open System Interconnection") model, such as the IP address of the sender and/or the recipient or the communication port used, are examined in order to determine the step 103, 104 to which the routing module 102 must guide the datum 101. In fact, in the example, some addresses and/or communication ports are associated with services authorized to transmit information via a different communications channel via the second network 112, the other addresses and/or communication ports being dedicated to transmissions of sensitive information, therefore requiring systematic encryption.

For example, a request sent by the first network 111 to a domain name server located on the second network 112 is guided to the filtering step 104 and not to the encryption step 103, since the data contained in this request may not be considered as sensitive. The example may be extended to a multitude of services—for example, bandwidth resource reservation services, directories, universal time servers—notably depending on security constraints imposed on the networks concerned. The method may therefore be seen as an encryption method with controlled opacity, the level of opacity being configured according to the proportion of services authorized to transmit information via the filtering step 104 and according to the context of use and the level of associated threats. The opacity is of course maintained at a high level for the networks which require high levels of protection. The conventional case of total encryption may furthermore be obtained by not authorizing any transmission via the filtering step 104, in other words by forcing the routing module 102 to guide the received data systematically to the encryption step 103.

Nevertheless, the authorization to transmit data between networks with different security levels must be accompanied by protection measures. In fact, it is possible to divert a communication which appears harmless in order to create a hidden or auxiliary communications channel. Notably, for a sequence of data packets, each packet taken separately may not contain sensitive information, whereas a succession of these packets may result in the creation of a communication code. For example, during the transmission of a sequence of requests of the same type from the first network 111 to the second network 112, the presence of a more or less long time interval between each request may constitute a code which can be exploited to cause leakage of information to the outside of the first network 111. For example, in the case of marking of packets for the purpose of managing the quality of service in the routing of said packets, an abnormal variation in the value of the quality of service marker during the transmission of a succession of packets may also constitute a hidden communications channel.

Secondly, if the datum is guided to an encryption step 103, the encrypted datum 101' produced by said step is transmitted to the second network 112; if the datum is guided to the filtering step 104, it undergoes a processing intended to preempt any attempt on the part of an attacker to create a hidden communications channel. The datum 101" resulting from this processing is therefore a datum which has been filtered and cleaned from possible resulting auxiliary channels. In the example, the processing of the filtering step 104 comprises a syntactic analysis phase, a semantic analysis phase and a behavioral analysis phase. The type of the datum is initially determined in order to initialize the parameters of each of the analysis phases.

The syntactic analysis checks that the datum to be transmitted complies scrupulously with the standards, for example RFC ("Request For Comments") documents or the standard of the protocol used, and that no field is diverted from its object. Notably, anomalies in the field values are detected. For example, in the case of a DNS ("Domain Name System") request, it is appropriate to make sure that the host name to be resolved complies with the format described by the RFCs 1034 and 1035. In particular, given that the host name to be resolved is not case-sensitive, i.e. it may be lower or upper case, the filtering step 104 may then, according to one embodiment, overwrite the request either in upper case or in lower case, or by combining the two in order to reduce the hidden channels on the typography used.

The semantic analysis performs a plurality of functions. On the one hand, it checks the controller of the possible states for a given protocol and the consistency of the concatenations of said states. On the other hand, the semantic analysis detects any hidden meaning disguised in a request or a response to this request. Moreover, the semantic analysis manages the connection contexts which guarantee that a response originating from the less sensitive second network 112 is in fact associated with an active request transmitted from the more sensitive first network 111.

According to one embodiment, in addition to ensuring that the response corresponds to an active context which, for example, can be defined by a pair (IP source address—source port; IP destination address—destination port), the semantic analysis checks that the response makes sense, i.e. that the response corresponds to response cases which are probable in terms of the protocol. In the example of a DNS ("Domain Name System") request transmitted by the first network 111 to a DNS server present on the second network 112, there is only one single response expected on the part of the first network 111. Moreover, this response must be consistent with the transmitted request. If the DNS request is intended to obtain the resolution of the name of a host, the semantic analysis phase must check that the response obtained is consistent with the request submitted (if the resolution succeeds, the IP address of the resolved host must be obtained here) and, for example, that the IP address obtained corresponds to a host which can in fact be contacted, i.e. is accessible via a simple IP routing.

The behavioral analysis is preferably carried out after the aforementioned syntactic and semantic analysis phases. The behavioral analysis phase is based on a cognitive process, i.e. a structure which is intended to give a meaning to an information exchange process. To illustrate this new approach in the filtering analyses, probable examples of interconnection scenarios can be used, where each scenario could correspond to a predetermined usage of a given protocol, taking into account not only the sequential aspects but also the temporal aspects of the communications. A statistical sampling may, for example, be carried out to check the volume of data transmitted between the first network 111 and the second network 112, for a chosen protocol and during a certain time period. An abnormally high volume of data may then indicate an attack. Similarly, the time intervals between a first data transmission from the first network 111 to the second network 112 and a second transmission of data between said networks can be analyzed. Thus, during data exchanges via a protocol, if the transition between two states of the protocol controller is of an abnormally short or long duration compared with the expected durations, an attack alarm is triggered.

For example, in the case of an analysis of DNS requests, it is totally acceptable for the same user to send DNS requests several times in succession intending to resolve a plurality of domain names, even within a very short period of time. Conversely, if this same user, identified, for example, by his IP source address, were to send requests several times in succession with the aim of resolving the IP address of the same DNS host within a period of time shorter than the duration of his DNS cache, a malicious act would then be suspected since his workstation should normally retain the resolved IP address for a defined, parameterizable period (generally several minutes). In order to limit false alarms, it is advised to define parameterizable thresholds, on the basis of which it is recommended to trigger alarms. In a different example relating to a behavioral analysis dedicated to DHCP requests ("Dynamic Host Configuration Protocol", allowing assignment of an IP address for a limited lease), it is totally acceptable for a client host, identified, for example, by its MAC (Ethernet) address, to send a DHCP request several times per day in order to obtain an IP address (taking into account, for example, the multiple branches of the network cable), whereas a server host will submit the request once only, on the renewal of its lease or on restarting.

If an anomaly is detected, the datum is not transmitted to the second network 112. Other processing operations are possible on detection of an anomaly. For example, an alarm may be triggered to prevent data of the same type as the datum involved in the anomaly from being transmitted between the networks of different sensitivities. This may be carried out by modifying the configuration of the routing module 102.

According to a different embodiment, the filtering step 104 carries out only a part of the aforementioned analysis phases, for example, only the syntactic analysis and semantic analysis phases.

According to one embodiment, the filtering step 104 also implements a data re-transcription step to reduce the risks of leakage of information from the first network 111. Thus, in the case of a sequence of requests (for example SIP ("Session Initialization Protocol") requests), transmitted by the first network 111, some requests from said sequence are reformulated in the format of a different protocol with analogous functions (for example, SIP requests are retranslated into H.323 requests) to eliminate redundant information and/or vary the format of the request, thereby increasing the difficulties of creating a hidden communications channel.

Figure 2:
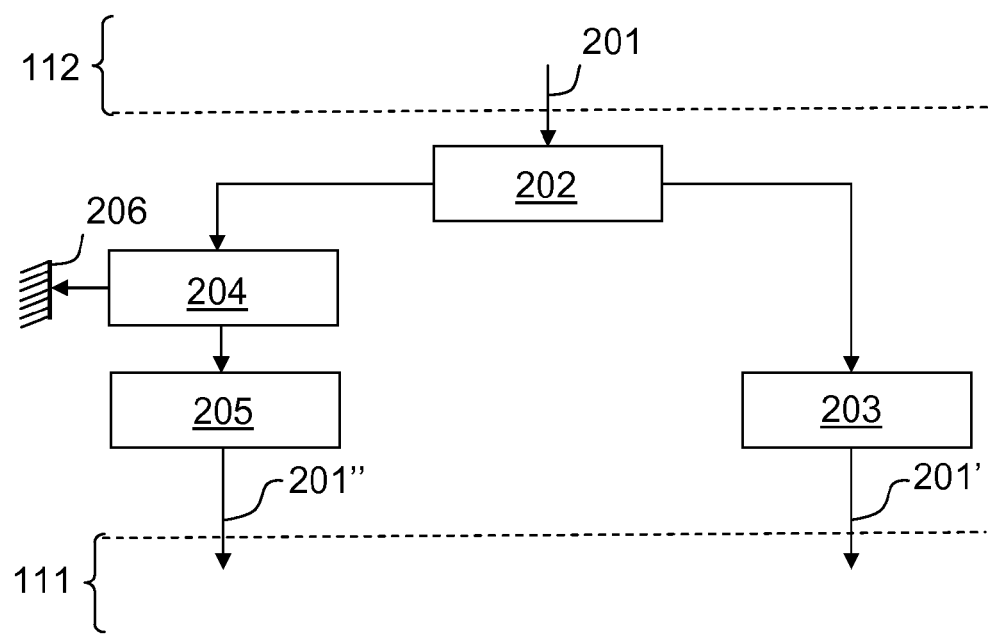
FIG. 2 shows a synopsis illustrating the steps of transmission of a datum between the same networks as shown in FIG. 1, but in the opposite direction, by applying a protection method according to the invention (uplink direction)

FIG. 2 shows a synopsis illustrating the steps of transmission of a datum between the same networks as shown in FIG. 1, but in the opposite direction. The datum 201 is transmitted from the second network 112 to the first network 111, which has a higher security level than the second, by applying a protection method according to the invention.

Firstly, the datum 201 is received by a routing module 202 which guides it either to a decryption step 203, or to a context checking step 204.

If the datum 201 is encrypted (if it is, for example, a datum transported by the IPSec ("Internet Protocol Security") protocols, the datum 201 is guided to the decryption step 203. If the decryption is performed correctly, the decrypted datum 201' resulting from this decryption step 203 is then transmitted to the first network 111.

Conversely, if the datum 201 is not encrypted, it is guided to the context checking step 204. This step analyses the context of the datum in terms of the context parameters saved during the filtering step 104 (FIG. 1). This involves, for example, checks carried out on the fields relating to layer 3 of the OSI model, such as, for example, checking of a DSCP ("Differentiated Services Code Point") field which is used for the management of the quality of service, or the checking of an MTU ("Maximum Transmission Unit") size and authorized MTU size variations. It may also involve checks in the application layer (layer 7 of the OSI model), for example to analyze RSVP ("Resource ReSerVation Protocol") resource reservation requests or DNS requests. If the context is inconsistent with the context previously recorded in the filtering step 104, the datum is then blocked, 206, and an alarm can be triggered. For example, if a response is received from the second network 112 although no request had been transmitted by the first network 111 to the second network 112 (no context had been created), this response is blocked. Otherwise, if the context is consistent with the recorded context, the datum 201 is transmitted to a filtering step 205, which applies the analysis phases mentioned above for FIG. 1.

Figure 3:
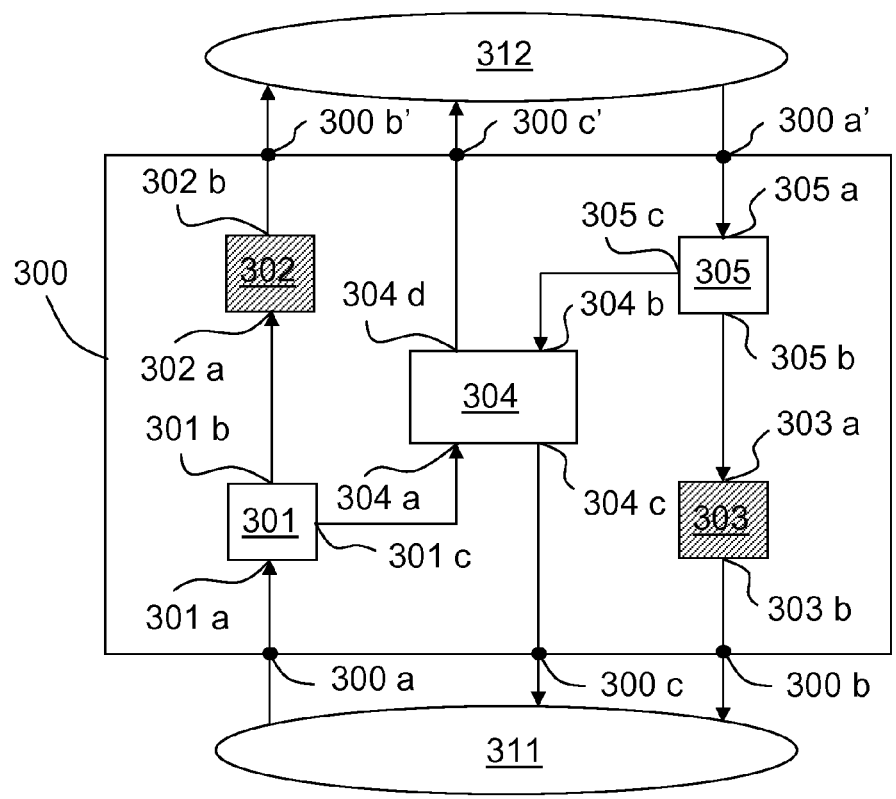
FIG. 3 is an example of the architecture of a device implementing the protection method according to the invention.

FIG. 3 shows an example of the architecture of a device implementing the method according to the invention. The device 300 is inserted between a confidential network 311 and a public network 312. It comprises a first routing module 301, an encryption module 302, a decryption module 303, a filtering module 304 and a second routing module 305.

The device 300 comprises a first input 300a connected to the confidential network 311, a second input 300a' connected to the public network 312, a first output 300b and a second output 300c connected to the confidential network 311, a third output 300b' and a fourth output 300c' connected to the public network 312.

The first routing module 301 comprises an input 301a and two outputs 301b, 301c, its input 301a being connected to the first input 300a of the device 300. The second routing module 305 comprises an input 305a and two outputs 305b, 305c, its input 305a being connected to the second input 300a' of the device 300.

The encryption module 302 comprises an input 302a connected to the first output 301b of the first routing module 301, and an output 302b connected to the third output 300b' of the device 300. The decryption module 303 comprises an input 303a, connected to the first output 305b of the second routing module 305, and an output 303b connected to the first output 300b of the device 300. The encryption module 302 and the decryption module 303 are based on conventional cryptography techniques.

The filtering module 304 comprises two inputs 304a, 304b and two outputs 304c, 304d, its first input 304a being connected to the second output 301c of the first routing module 301, its second input 304b being connected to the second output 305c of the second routing module 305, its first output 304c being connected to the second output 300c of the device 300, and its second output 304d being connected to the fourth output 300c' of the device 300.

The filtering module 304 is based notably on a database of filters, each filter corresponding to a type of data to be checked. Each filter implements one or more analysis phases of the filtering step 104 (FIG. 1). A filter is formed, for example, from a set of parameters and/or software components. Once the datum type has been identified, the parameters and possibly the software components corresponding to the type of the datum to be checked are loaded and executed by the filtering module 304.

For example, the database includes a filter to check DHCP requests, a filter for DNS requests, and a filter for resource reservation requests using the RSVP protocol ("Resource ReSerVation Protocol"). Also, an open and modular architecture is highly desirable, such an architecture allowing a new filter to be integrated and/or a filter to be removed from the database without adversely affecting the operation of the other filters. Thus, security approvals can be operated filter by filter, only an approved filter being integrated into the filter database. According to a different embodiment, some filters are implemented via electronic circuits, on programmable components, for example.

Moreover, the protection device 300 is preferably installed in a controlled space, for example within the confidential network 311, in order to physically protect its second input 300a' and its second output 300c against potential attackers.

Advantageously, the protection device 300 is physically screened, notably to avoid attacks through auxiliary channels, notably via the analysis of the electrical current consumed by the device and the electromagnetic radiation emitted by the device.

Figure 4:
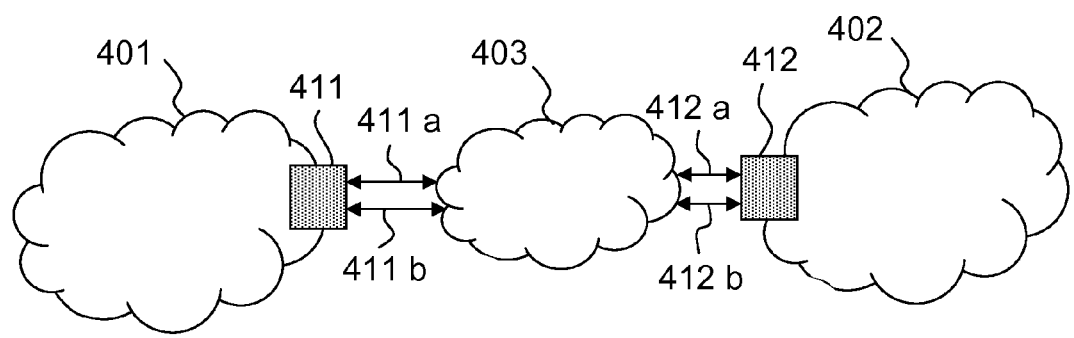
FIG. 4 shows a synopsis illustrating the use of a protection device according to the invention to allow two protected networks to communicate with one another via an intermediate public network.

FIG. 4 shows a synopsis illustrating the use of a device according to the invention to allow two protected networks 401, 402 to communicate with one another via an intermediate public network 403.

A first corporate network 401 must communicate with a second corporate network 402. These two networks 401, 402 communicate via the public network 403. The data present on the two corporate networks 401, 402 being confidential, none of these data must be transmitted in unencrypted form on the public network 403. A protected link is therefore established between the two corporate networks 401, 402 by locating a protection device 411, 412 according to the invention at the output of each of them, in such a way that all of the incoming or outgoing data of a corporate network is encrypted/decrypted 411a, 412a, or filtered 411b, 412b. The protection device according to the invention therefore allows a communications channel to be established in parallel with the conventional encrypted communications channel, this parallel communications channel authorizing a controlled interoperability between a corporate network 401, 402 and the public network 403.

In the case where the two corporate networks 401, 402 are already connected via a conventional protected link including an encryptor at the output of each corporate network 401, 402, it generally suffices to replace each encryptor with a protection device according to the invention. Thus, one of the advantages of the invention is the ease of its implementation within an existing protected architecture.

The device according to the invention comprises a plurality of advantages. It allows equipment to be shared and manpower and operating procedures to be reduced. Moreover, by proposing a solution of controlled exchanges of signaling data between networks with different levels of security, it enables a greater responsiveness of the networks with higher levels of security in the event of changes in load or topology of the surrounding networks.

The invention claimed is:

1. A method for securing a two-way communications channel between at least a network N1 and a network N2 with a lower level of security than N1, said method comprising at least the following steps:
defining one or more types of data authorized to be transmitted from N1 to N2;
for a datum transmitted from N1 to N2:
if the datum is of a type authorized to be transmitted between N1 and N2, routing the datum to a first filtering step performed by electronic circuits configured to perform the first filtering step, otherwise routing the datum to an encryption step,
if the datum is routed to the first filtering step:
saving the context associated with this datum,
applying one or more analysis filters to the datum to prevent the creation of a hidden communications channel,
for a datum transmitted from N2 to N1:
if the datum is of a type authorized to be transmitted between N1 and N2, routing the datum to a second filtering step performed by electronic circuits configured to perform the second filtering step, otherwise routing the datum to a decryption step;
if the datum is routed to the second filtering step:
comparing the context of the datum with the context saved in the first filtering step and blocking the datum if the contexts are inconsistent, otherwise, applying one or more analysis filters to the datum.

2. The protection method as claimed in claim 1, wherein the filtering step comprises a phase of syntactic analysis of the data, said phase checking the validity of the format of the datum according to the protocol used for the transmission of this datum.

3. The protection method as claimed in claim 1, wherein the filtering step comprises a phase of semantic analysis of the data, said phase checking the consistency of the responses transmitted from the network N2 to the network N1 in relation to the requests transmitted by the network N1 to the network N2.

4. The protection method as claimed in claim 1, wherein the filtering step comprises a phase of behavioral analysis of the data, said phase evaluating the probability of harmlessness of the data exchanges between the network N1 and the network N2 with regard to predefined scenarios for interconnection between these two networks, an interconnection scenario defining, on the basis of the states of the controller(s) defined by the data transmission protocol, expected durations of transition between these states.

5. The protection method as claimed in claim 1, wherein the filtering step comprises a phase of retranscription of a datum formatted by a first protocol to retranslate it into a datum formatted by a second protocol.

6. A device to establish a two-way communications channel between at least a first network N1 and a second network N2 with a lower level of security than N1, the device including an encryption module and a decryption module, wherein said device comprises at least a first routing module, a second routing module and a filtering module comprising electronic circuits, the first routing module guiding the data packets originating from the first network N1 either to the encryption module or to the filtering module, the second routing module guiding the data packets originating from the second network N2 either to the decryption module or to the filtering module, the filtering module implementing the protection method as claimed in claim 1.

\* \* \* \* \*

UNITED STATES PATENT AND TRADEMARK OFFICE
CERTIFICATE OF CORRECTION

PATENT NO.       : 8,443,190 B2  
APPLICATION NO.  : 12/745555  
DATED            : May 14, 2013  
INVENTOR(S)      : Breton et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 368 days.

Signed and Sealed this
Eighth Day of September, 2015

Michelle K. Lee
*Director of the United States Patent and Trademark Office*